(12) United States Patent
Kanai

(10) Patent No.: US 9,975,411 B2
(45) Date of Patent: May 22, 2018

(54) SUNROOF DEVICE

(71) Applicant: YACHIYO INDUSTRY CO., LTD., Saitama (JP)

(72) Inventor: Toshiyuki Kanai, Saitama (JP)

(73) Assignee: Yachiyo Industry Co., Ltd., Saitama (JP)

( * ) Notice: Subject to any disclaimer, the term of this patent is extended or adjusted under 35 U.S.C. 154(b) by 121 days.

(21) Appl. No.: 15/128,351

(22) PCT Filed: Feb. 20, 2015

(86) PCT No.: PCT/JP2015/054719
§ 371 (c)(1),
(2) Date: Sep. 22, 2016

(87) PCT Pub. No.: WO2015/146395
PCT Pub. Date: Oct. 1, 2015

(65) Prior Publication Data
US 2017/0305243 A1 Oct. 26, 2017

(30) Foreign Application Priority Data
Mar. 24, 2014 (JP) .................................. 2014-059935

(51) Int. Cl.
*B60J 7/043* (2006.01)
*B60J 7/057* (2006.01)

(52) U.S. Cl.
CPC ............. *B60J 7/0435* (2013.01); *B60J 7/057* (2013.01)

(58) Field of Classification Search
CPC ................................ B60J 7/0435; B60J 7/057
USPC ............................................. 296/216.01–224
See application file for complete search history.

(56) References Cited

U.S. PATENT DOCUMENTS

2013/0099528 A1    4/2013 Grimm et al.

FOREIGN PATENT DOCUMENTS

| DE | 103 36 618 A1 | 5/2005 |
| DE | 10 2008 017526 B3 | 9/2009 |
| GB | 2068304 A | 8/1981 |
| JP | 56-57516 A | 5/1981 |

(Continued)

OTHER PUBLICATIONS

International Search Report by Japanese Patent Office for corresponding PCT/JP2015/054719 application dated May 26, 2015 (4 pages).

(Continued)

*Primary Examiner* — Dennis H Pedder
(74) *Attorney, Agent, or Firm* — Capitol City TechLaw, PLLC; Samuel P. Burkholder

(57) ABSTRACT

Provided is a sunroof device including: a stay that is attached to a roof panel; a lifting arm that serves to lift, and support the weight of, the roof panel; and a guide member that is attached to the lifting arm and guides the sliding of the roof panel via a guide groove into which the stay is fit, wherein the guide member is configured to include a first member that is molded of a resin material and has the guide groove, and a second member as a reinforcing member that covers the first member, wherein the first member can be inserted into or removed from the second member in the sliding direction of the roof panel and is mounted to the second member by a snap-fit coupling means that exploits elastic deformation of the first member toward the guide groove This arrangement facilitates assembling the guide member.

3 Claims, 5 Drawing Sheets

(56) References Cited

FOREIGN PATENT DOCUMENTS

| JP | 62-265021 A | 11/1987 |
|---|---|---|
| JP | 63-128124 | 8/1988 |
| JP | H04 107110 U | 9/1992 |

OTHER PUBLICATIONS

Extended European Search Report by European Patent Office for corresponding EP 15 76 9480 application dated Jan. 24, 2018 (8 pages).

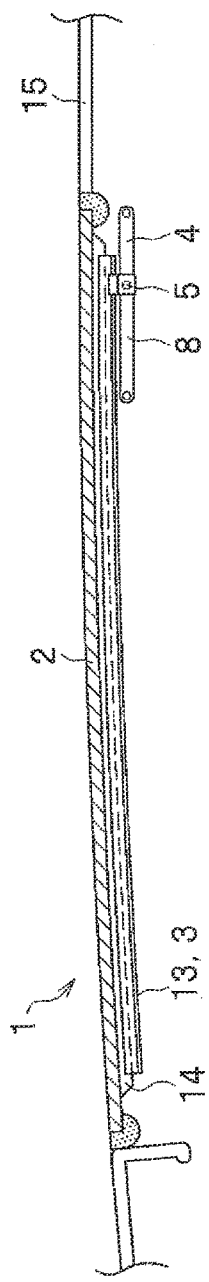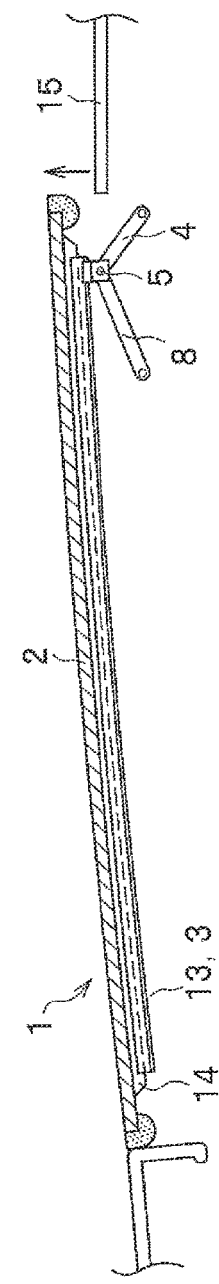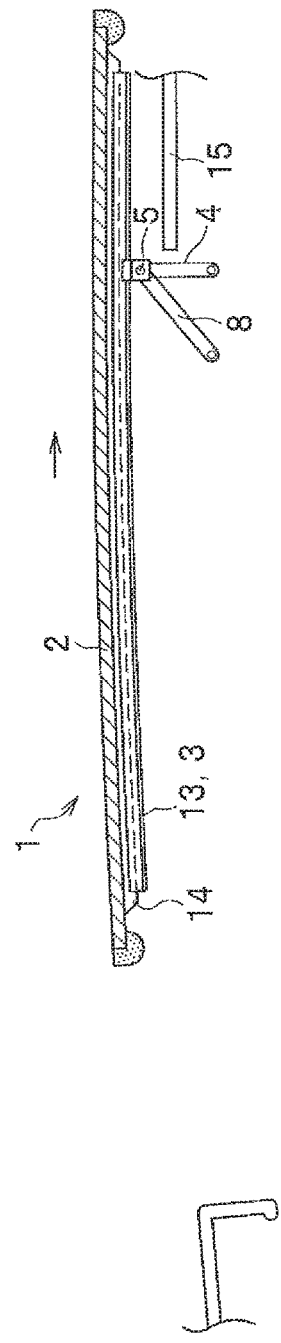
FIG.1A
FIG.1B
FIG.1C

SUNROOF DEVICE

CROSS-REFERENCE TO RELATED APPLICATION

This application is a U.S. National Stage Application under 35 U.S.C § 371 of International Patent Application No. PCT/JP2015/054719 filed 20 Feb. 2015, which claims the benefit of priority to Japanese Patent Application No. 2014-059935 filed 24 Mar. 2014, the disclosures of all of which are hereby incorporated by reference in their entities.

TECHNICAL FIELD

The present invention relates to a sunroof device.

BACKGROUND ART

An automotive sunroof device is known in which guide members are attached to lifting arms for guiding the sliding of a roof panel. Japanese Patent Application Publication No. S62-265021, for example, describes a structure in which a slider serving as the guide member is arranged at an edge of the lifting arm in a rear lifting device and a guide rail having a guide groove is attached to a lower surface of the roof panel. According to this, the guide grooves of the guide rails are guided by the sliders to guide the sliding of the roof panel.

In the structure described in Japanese Patent Application Publication No. S62-265021, a guide groove is formed in the guide rail attached to the roof panel to fit the slider as a guide member in the guide groove, however, there is a structure in which a guide groove is instead formed in a guide member. Such a conventional example is shown in FIG. 5. Attached to a lower surface of a roof panel (not shown) is a stay 51 that has a vertical surface 51A and a horizontal surface 51B to present an L-shaped cross section, and extends in a longitudinal direction of a vehicle. A guide member 54 that has a guide groove 53 for the entire horizontal surface 51B and a lower part of the vertical surface 51A of the stay 51 to run through is mounted to the edge of the lifting arm 52, which is attached to the vehicle body. According to this structure, there is no need for the stay 51 to have guide grooves, having an advantage that the stay 51 can be simplified in its shape.

The stay 51 is composed of a metallic material such as for securing strength, and then, if groove walls of the guide groove 53 are also composed of a metallic material, friction during sliding is increased to be prone to cause a sliding noise. Therefore, the guide groove 53 is formed in a resin guide member 55 made of a resin material. Here, the lifting arm 52 is also responsible for supporting the weight of the roof panel, in addition to lifting and lowering the roof panel, to cause the guide member 54 to receive a load of the weight of the roof panel. As the resin guide member 55 alone has insufficient strength for this load, the guide member 54 is configured to include the resin guide member 55 and a reinforcing member 56 made of a metallic material for covering the former.

SUMMARY OF THE INVENTION

Problems to be Solved

A conventional guide member 54 has a structure in which a resin guide member 55 is fastened by riveting to the reinforcing member 56, to have a problem that assembling the guide member 54 requires extra time and effort for a riveting step.

The present invention has been invented to solve such problems, and is intended to provide a sunroof device that facilitates assembling a guide member, which guides the sliding of the roof panel.

Solution to Problems

To solve the above problems, the present invention provides a sunroof device including: a guided portion that is attached to a roof panel and extends along a sliding direction of the roof panel; a lifting arm that serves to lift, and support the weight of, the roof panel; and a guide member that is attached to the lifting arm and guides the sliding of the roof panel via a guide groove into which the guided portion is fit, wherein the guide member is configured to include a first member that is molded of a resin material and has the guide groove, and a second member as a reinforcing member that covers the first member so as to make it immovable in two directions orthogonal to the sliding direction, wherein the first member can be inserted into or removed from the second member in the sliding direction and is mounted to the second member so as to be immovable in the sliding direction by a snap-fit coupling means that exploits elastic deformation of the first member toward the guide groove.

The present invention eliminates fastening the first member and the second member to each other by riveting as in the prior art, and facilitates assembling both members only by inserting the first member into the second member. In addition, if there is any failure or the like in the first member, the first member can be removed by releasing the snap-fit coupling portion such as with a pin tool, in order to, for example, readily exchange with a brand-new first member.

Note that the "two directions orthogonal to the slide direction" mean a certain axial direction (X-axis direction) orthogonal to the sliding direction and an axial direction (Y-axis direction) orthogonal to the X-axis direction.

Further, the present invention is characterized in that the snap-fit coupling means are provided as a pair at positions across the guide groove.

According to the present invention, two coupling portions between the first member and the second member are provided across the sliding portion between the guided portion and the guide member, to make a binding condition between the first member and the second member more robust.

Moreover, in the present invention, the snap-fit coupling means may be configured to include an engaging convex formed on the first member and an engaging concave formed on the second member.

Advantageous Effects of the Invention

According to the present invention, assembling the guide member, which guides the sliding of the roof panel, is facilitated.

BRIEF DESCRIPTION OF THE DRAWINGS

FIGS. 1A to 1C are side views to show opening operation of a sunroof device;

DETAILED DESCRIPTION OF EMBODIMENTS

Figure 2:
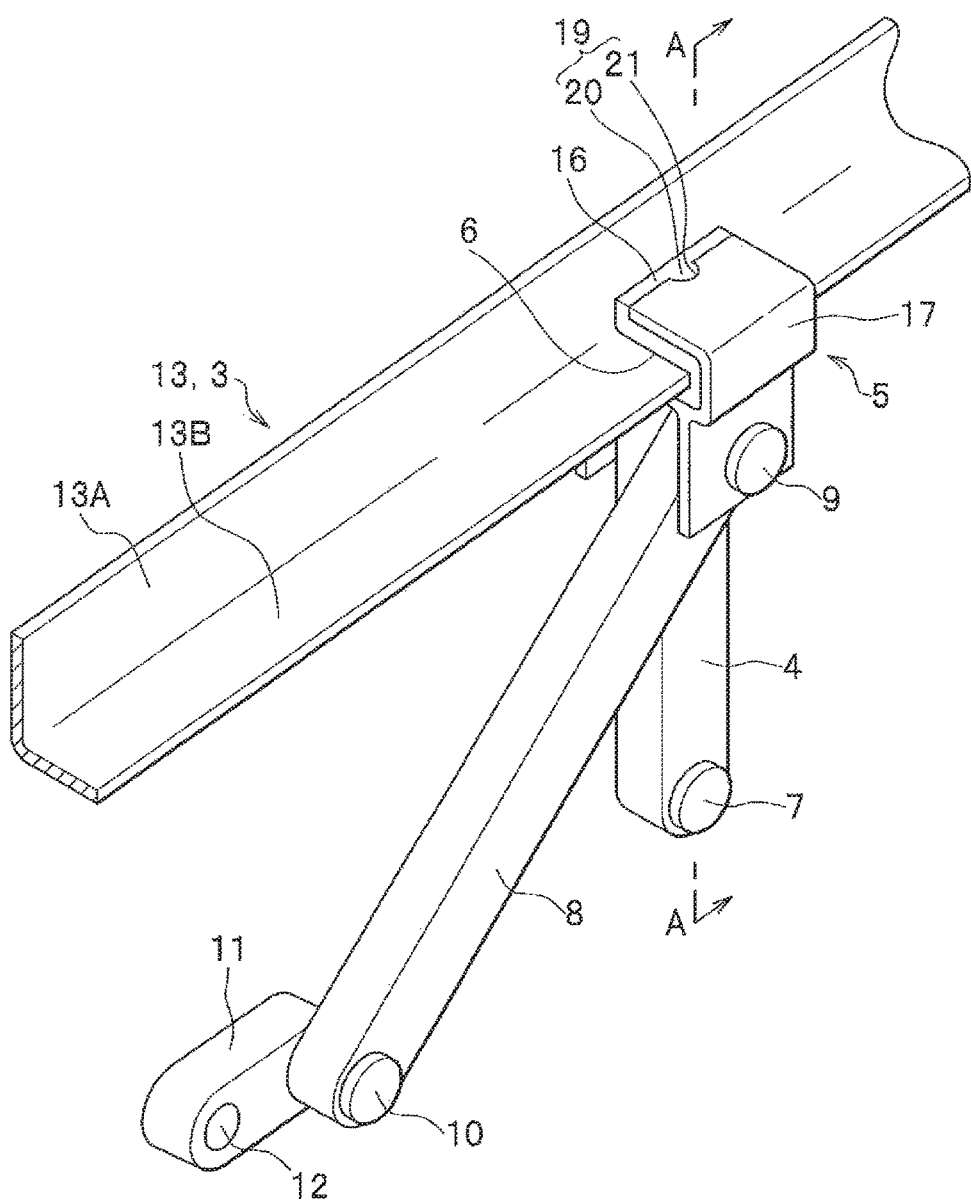
FIG. 2 is an external perspective view around a guide member.

In FIGS. 1A to 1C, a sunroof device 1 includes: a roof panel 2 that slides in a longitudinal direction of a vehicle; a guided portion 3 that is attached to the roof panel 2 and extends along a sliding direction of the roof panel 2; a lifting arm 4 that serves to lift, and supports the weight of, the roof panel 2; and a guide member 5 that is attached to the lifting arm 4 and guides the sliding of the roof panel 2 via a guide groove 6 into which the guided portion 3 is fit. The roof panel 2 is formed of a glass panel or the like.

In FIG. 2, the lifting arm 4 is pivotally supported by a shaft 7 running along a vehicle width direction so that a base end of the lifting arm 4 is rotatable with respect to a guide rail, which is not shown. The guide rail is a member fixed to a vehicle body (not shown). One end of a link arm 8 and the guide member 5 are connected together at a top end of the lifting arm 4 so as to be rotatable about a shaft 9 running along the vehicle width direction. The other end of the link arm 8 is connected to one end of a connecting member 11 via a shaft 10 running along the vehicle width direction. The other end of the connecting member 11 is connected, via a shaft 12 running along the vehicle width direction, with a slider (not shown) which slides in the guide rail.

The guided portion 3 includes, for example, stays 13 that are attached to a lower surface of the roof panel 2 at edges on both sides. The stay 13 is a plate-like member made of a metallic material, extending in the longitudinal direction of the vehicle, and is mounted generally, as shown in FIGS. 1A to 1C, by bolts or the like to a panel holder 14 which is attached to the lower surface of the roof panel 2 by an adhesive agent or the like. As shown in FIG. 2, the stay 13 includes a vertical surface 13A and a horizontal surface 13B, and has an L-shaped cross section. The guide member 5 is formed to have the guide groove 6 into which the entire horizontal surface 13B and a lower part of the vertical surface 13A of the stay 13 are fit.

A description will be given of operation of the sunroof device 1, with reference to FIGS. 1A to 1C. Note that, as for a lifting mechanism of the roof panel 2, another lifting means is also provided at a position closer to the front of the roof panel 2, in addition to the lifting arm 4 as illustrated, however that lifting means is not illustrated because it departs from the spirit of the present invention. In FIG. 1A, the roof panel 2 is fully closed, and both of the lifting arm 4 and the link arm 8 stay flat. When the slider (not shown) slightly slides rearward from this state, the other end of the link arm 8 is moved rearward to cause the link arm 8 and the lifting arm 4 to rise as shown in FIG. 1B, resulting in that a rear end of the roof panel 2 rises to be in a state of being tilted up. Then, the slider further slides rearward to cause the lifting arm 4 and the link arm 8 to rise most as shown in FIG. 1C and then keep the state, and the roof panel 2 slides rearward above a fixed roof 15 while the stay 13 is being guided by the guide groove 6 of the guide member 5. In a state where the roof panel 2 slides rearward, the load of the weight of the roof panel 2 is largely applied to the guide member 5 and the lifting arm 4.

<Guide Member 5>

Figure 3:
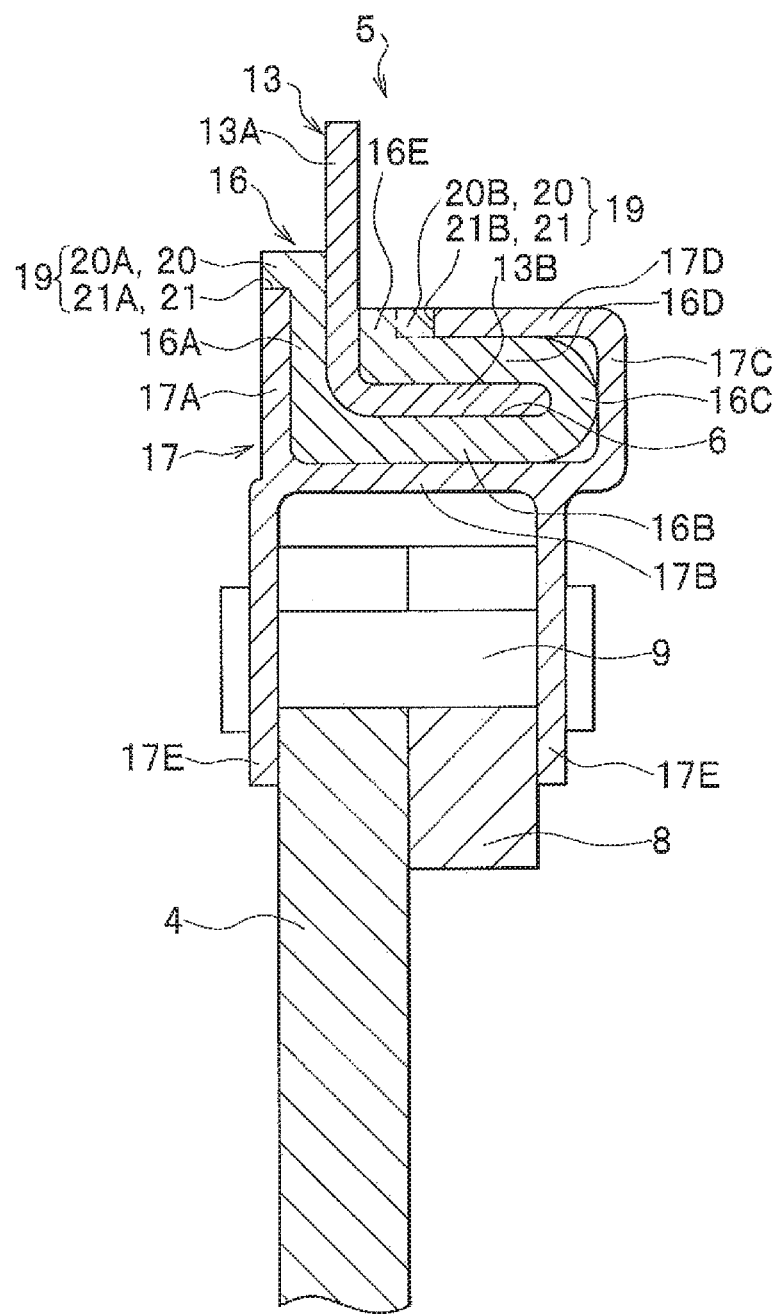
FIG. 3 is a cross-sectional view of a section taken along a line A-A in FIG. 2.

A description will be given of the guide member 5 with reference to FIGS. 3 and 4. The guide member 5 is configured to include a first member 16 that is molded of a resin material and has the guide groove 6, and a second member 17 as a reinforcing member that covers the first member 16 so as to make it immovable in two directions orthogonal to the sliding direction of the roof panel 2 (certain axial direction (X-axis direction) orthogonal to the sliding direction and an axial direction (Y-axis direction) orthogonal to the X-axis direction), specifically a vertical direction and a horizontal direction in FIG. 3. The guide member 5 is divided into two members, as described in the background art, in order to reduce friction during sliding and also ensure sufficient strength of the guide member 5.

The first member 16 is formed to include: a first vertical section 16A that contacts with one side of the vertical surface 13A of the stay 13; a lower section 16B that extends laterally from a lower end of the first vertical section 16A and contacts with a lower face of the horizontal surface 13B of the stay 13; an upper section 16D that extends from an extension end of the lower section 16B via a bent section 16C so as to be folded in a substantially U-shape, and further extends laterally for contacting with an upper face of the horizontal surface 13B of the stay 13; and a second vertical section 16E that extends upward from an extension end of the upper section 16D and contacts with the other side of the vertical surface 13A of the stay 13, and as a result to contain a groove-like space as a guide groove 6 which is surrounded by these sections and has a substantially L-shaped cross section. Note that the first member 16 has a state, until it is assembled to the second member 17, that the upper section 16D is slightly opened relative to the lower section 16B by the spring-back action, having the bent section 16C as a starting point.

The second member 17 is molded of a high-strength material, such as a metallic material, for receiving a load of the weight of the roof panel 2. The second member 17 is formed to include a first vertical wall 17A, a lower wall 17B, a second vertical wall 17C, and a top wall 17D that cover the first vertical section 16A, the lower section 16B, the bent section 16C, and the upper section 16D of the first member 16, respectively. There is a gap between the first vertical wall 17A and the upper wall 17D for the stay 13 to run through. In addition, a front and rear ends of the second member 17 are formed to have an opening 18 for the first member 16 to be inserted or removed in the sliding direction of the roof panel 2. A pair of mounting seats 17E are formed to extend downward from the lower wall 17B to allow the shaft 9 to run through both of the mounting seats 17E, to which the lifting arm 4 and the link arm 8 are rotatably connected.

<Snap-Fit Coupling Means 19>

The first member 16 is mounted to the second member 17 so as to be immovable in the sliding direction of the roof panel 2 by a snap-fit coupling means 19 that exploits elastic deformation of the first member 16 toward the guide groove 6. The snap-fit coupling means 19 according to the present embodiment is configured to include an engaging convex 20 formed in the first member 16 and an engaging concave 21 formed in the second member 17.

The first member 16 includes an engaging convex 20A that protrudes, in the center in the sliding direction, on the outer surface of the first vertical section 16A at an upper end, and an engaging convex 20B that protrudes, in the center in the sliding direction, on the outer surface of the second vertical section 16E at an upper end. On the other hand, the second member 17 includes an engaging concave 21A that is hollowed, in the center in the sliding direction, at an upper end of the first vertical wall 17A for engagement with the engaging convex 20A, and an engaging concave 21B that is hollowed, in the center in the sliding direction, at an extension end of the upper wall 17D for engagement with the engaging convex 20B. That is, in the present embodiment, the snap-fit coupling means 19 consisting of the engaging convex 20A and the engaging concave 21A, and the snap-fit coupling means 19 consisting of the engaging convex 20B and the engaging concave 21B are arranged across the guide groove 6.

<Action while Assembling Guide Member 5>

Figure 4:
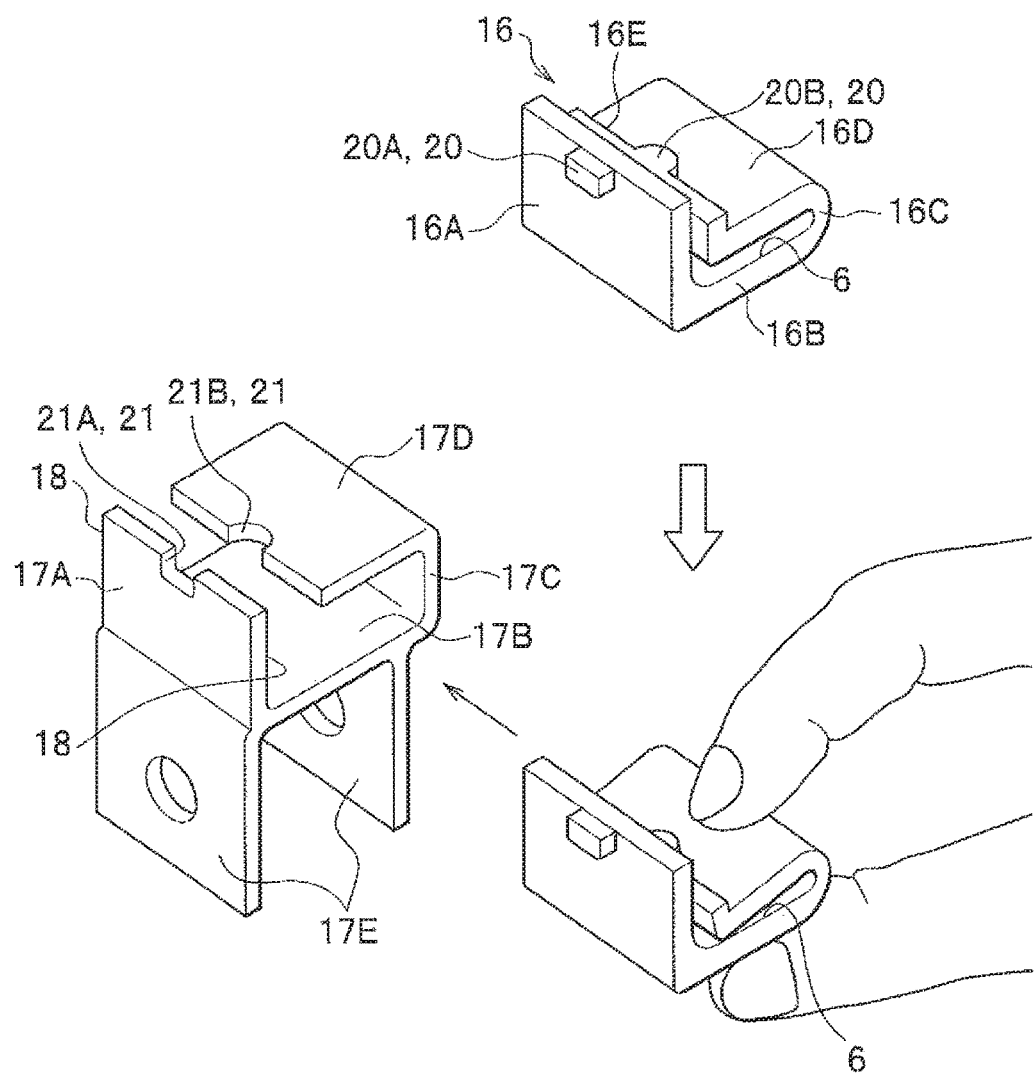
FIG. 4 is an external perspective view of the guide member.
Figure 5:
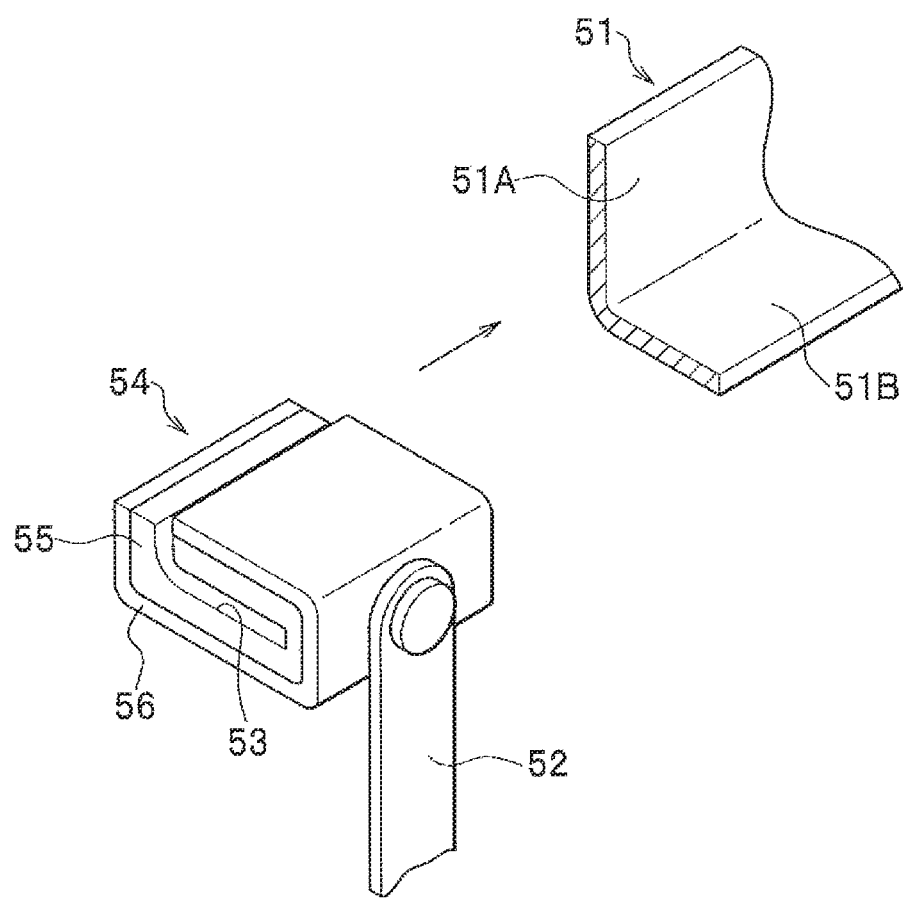
FIG. 5 is an external perspective view of a conventional guide member.

For mounting the first member 16 to the second member 17, as shown in FIG. 4, the first member 16 is inserted from one of the openings 18 of the second member 17. At this time, in order to avoid the engaging convexes 20A, 20B from interfering with the first vertical wall 17A of the second member 17 and the extension end of the upper wall 17D, respectively, the upper section 16D and the lower section 16B are picked with fingers and elastically deformed so that the upper section 16D is displaced toward the guide groove 6. This allows the engaging convex 20B to be inserted without being caught on the extension end of the upper wall 17D. Also, the first vertical section 16A is elastically deformed so as to be displaced toward the guide groove 6. This allows the engaging convex 20A to be inserted without being caught on the first vertical wall 17A.

Eventually when the first member 16 is inserted to a predetermined position, the engaging convexes 20A, 20B engage with the engaging concaves 21A, 21B, respectively, by the elastic restoring force of the first member 16. This means that the first member 16 is mounted to the second member 17 so as to be immovable in the sliding direction of the roof panel 2.

In a state that the stay 13 is inserted into the guide groove 6 of the first member 16, the first member 16 mounted by the snap-fit coupling means 19 is protected by the stay 13 on the inside and by the second member 17 on the outside from being deflected to ensure that the first member 16 does not come off the second member 17.

As described above, the guide member 5 has a structure in which the first member 16 is inserted into or removed from the second member 17 in the sliding direction of the roof panel 2, and mounted to the second member 17 so as to be immovable in the sliding direction of the roof panel 2 by the snap-fit coupling means 19 that exploits elastic deformation of the first member 16 toward the guide groove 6, to eliminate fastening both members to each other by riveting as in the prior art, and to facilitate assembling both members only by inserting the first member 16 into the second member 17.

In addition, if there is any failure or the like in the first member 16, the first member 16 can be removed by releasing the snap-fit coupling portion such as with a pin tool, in order to, for example, readily exchange with a brand-new first member 16.

Further, the snap-fit coupling means 19 are provided as a pair at positions across the guide groove 6, to have two coupling portions provided across the sliding portion between the stay 13 and the guide member 5, making a binding condition between the first member 16 and the second member 17 more robust.

Hereinabove, the preferred embodiment of the present invention has been described. The snap-fit coupling means 19 may be formed to include an engaging convex 20 on the second member 17 and an engaging concave 21 on the first member 16.

Furthermore, the guided portion 3 of the roof panel 2 is the stay 13 in the embodiment described above, but the guided portion 3 may possibly be the panel holder 14, or other member which is fixed to the roof panel 2.

Moreover, the shape of the lifting arm 4 is not particularly limited either to the one as described above.

The invention claimed is:

1. A sunroof device including:
   a guided portion that is attached to a roof panel and extends along a sliding direction of the roof panel;
   a lifting arm that serves to lift, and support the weight of, the roof panel; and
   a guide member that is attached to the lifting arm and guides the sliding of the roof panel via a guide groove into which the guided portion is fit,
   wherein the guide member is configured to include a first member that is molded of a resin material and has the guide groove, and a second member as a reinforcing member that covers the first member so as to make it immovable in two directions orthogonal to the sliding direction, and
   wherein the first member can be inserted into or removed from the second member in the sliding direction and is mounted to the second member so as to be immovable in the sliding direction by a snap-fit coupling means that exploits elastic deformation of the first member toward the guide groove.

2. The sunroof device according to claim 1, wherein the snap-fit coupling means are provided as a pair at positions across the guide groove.

3. The sunroof device according to claim 1, wherein the snap-fit coupling means is configured to include an engaging convex formed on the first member and an engaging concave formed on the second member.

* * * * *